US009638340B2

(12) United States Patent
Bachofer (10) Patent No.: US 9,638,340 B2
(45) Date of Patent: May 2, 2017

(54) DISC VALVE

(71) Applicant: MACK & SCHNEIDER GmbH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 50 days.

(21) Appl. No.: 14/706,131

(22) Filed: May 7, 2015

(65) Prior Publication Data

US 2015/0233482 A1    Aug. 20, 2015

Related U.S. Application Data

(63) Continuation of application No. PCT/EP2013/073223, filed on Nov. 7, 2013.

(30) Foreign Application Priority Data

Nov. 7, 2012  (DE) .................. 10 2012 022 211

(51) Int. Cl.
   *F16K 3/08*    (2006.01)
   *F16K 11/074*  (2006.01)
   *F16K 27/04*   (2006.01)

(52) U.S. Cl.
   CPC ... *F16K 11/0743* (2013.01); *Y10T 137/86533* (2015.04); *Y10T 137/86823* (2015.04); *Y10T 137/86831* (2015.04)

(58) Field of Classification Search
   CPC .... F16K 11/074; F16K 27/045; F16K 27/048; F16K 3/08; Y10T 137/86533;
   (Continued)

(56) References Cited

U.S. PATENT DOCUMENTS 5,022,429 A * 6/1991 Rollini ............... E03C 1/104
                                                  137/218
5,398,717 A * 3/1995 Goncze ................ F16K 3/08
                                                  137/270

(Continued)

FOREIGN PATENT DOCUMENTS

DE    EP 0221231 A1 * 5/1987 ............. B60T 15/02
DE    EP 0265537 A1 * 5/1988 ............. F16K 3/08

(Continued)

OTHER PUBLICATIONS

International Search Report of corresponding International Application No. PCT/EP2013/073223, mailed on Feb. 20, 2014.

(Continued)

*Primary Examiner* — Marina Tietjen
*Assistant Examiner* — Seth W MacKay-Smith
(74) *Attorney, Agent, or Firm* — Edell, Shapiro & Finnan LLC (57) ABSTRACT

A multiway control valve is provided having a housing that has an inlet connection and an outlet connection for a liquid and/or gaseous medium, a rotatably mounted ceramic valve disc, which is arranged with a first through-flow opening and rotatably mounted in the housing to fluidically connect and disconnect from each other the connections depending on its rotational position. The valve disc rests flatly on a ceramic sealing disc, arranged in a torque-proof manner and having two second through-flow openings, and a sealing element, which is arranged between the sealing disc and an intermediate floor of the housing and is elastically deformable. The sealing element has a disc shape and has third through-flow openings that are aligned with the second through-flow openings. The intermediate floor has at least one retaining projection that engages in one of the three through-flow (Continued)

openings for positively locking anti-twist protection of the sealing element.

15 Claims, 6 Drawing Sheets

(58) Field of Classification Search
CPC ..... Y10T 137/86823; Y10T 137/86831; Y10T 137/86863; Y10T 137/87676; Y10T 137/87692; Y10T 137/877; Y10T 137/87708; Y10T 137/87909
See application file for complete search history.

(56) References Cited

U.S. PATENT DOCUMENTS

| | | | | |
|---|---|---|---|---|
| 6,135,152 A * | 10/2000 | Knapp | ................ | F16K 11/0746 137/625.41 |
| RE38,493 E * | 4/2004 | Keefer | ............... | B01D 53/0446 95/100 |
| 6,892,761 B2 * | 5/2005 | Chen | ................... | F16K 11/0743 137/625.4 |
| 7,007,717 B2 * | 3/2006 | Lin | ..................... | F16K 11/0743 137/625.41 |
| 7,174,916 B2 * | 2/2007 | Chang | ................ | F16K 11/0743 137/625.41 |
| 7,500,490 B2 * | 3/2009 | Wagner | .............. | B01D 53/0446 137/312 |
| 7,779,865 B2 * | 8/2010 | Shay | ......................... | F16K 3/04 137/454.6 |
| 8,079,384 B2 * | 12/2011 | Chen | ..................... | F16K 3/0236 137/625.4 |
| 8,695,635 B1 * | 4/2014 | Wang | .................. | F16K 11/0787 137/597 |
| 8,857,469 B2 * | 10/2014 | Wang | .................... | F16K 11/074 137/625.15 |
| 8,985,148 B2 * | 3/2015 | Chang | .................. | F16K 11/076 137/597 |
| 2009/0025800 A1 | 1/2009 | Lopp et al. | | |

FOREIGN PATENT DOCUMENTS

| | | | | |
|---|---|---|---|---|
| DE | 3890735 | | 9/1989 | |
| DE | 4427745 | | 2/1996 | |
| DE | 19641545 A1 * | | 4/1998 | ............... F16K 3/08 |
| DE | 10161858 | | 6/2003 | |
| DE | EP 1319877 A2 * | | 8/2003 | ........... F16K 11/074 |
| EP | 2151613 | | 2/2010 | |
| WO | 0106156 | | 1/2001 | |
| WO | 03078875 | | 9/2003 | |

OTHER PUBLICATIONS

English language International Preliminary Report on Patentability for International Patent Application No. PCT/EP2013/073223.

\* cited by examiner

DISC VALVE

CROSS REFERENCE TO RELATED APPLICATIONS

This application is a continuation of International Application No. PCT/EP2013/073223, filed on Nov. 7, 2013, which claims priority under 35 U.S.C. §119 to Application No. DE 102012022211.4 filed on Nov. 7, 2012, the entire contents of which are hereby incorporated by reference.

FIELD OF THE INVENTION

The invention relates to a disc valve, in particular to a multiway control valve, having a housing that has at least one inlet connection to at least one outlet connection as connections for a liquid and/or gaseous medium, at least one rotatably mounted valve disc, in particular a ceramic valve disc, which is provided with at least one first through-flow opening and is arranged rotatably mounted in the housing in order to fluidically connect and disconnect the connections depending on its rotational position, and the valve disc rests flatly on at least one sealing disc, in particular a ceramic sealing disc, which is in a torque-proof arrangement and has at least two second through-flow openings, and a sealing element, which is arranged between the sealing disc and an intermediate floor of the housing and is elastically deformable, the sealing element being configured in disc shape and having third through-flow openings that are aligned with the second through-flow openings.

BACKGROUND

Disc valves are generally known from the prior art and are used, for example, in motor vehicles to control cooling water circuits or in beverage vending machines. A generic disc valve, in which a sealing element is provided between sealing disc and housing, is known, for example, from DE 10 2008 041 122 A1. In order to prevent rotation of the sealing element, the latter is provided with an essentially square outer contour, while the housing that accommodates the sealing element has a circular cross section, and radial projections extend into the lateral free spaces produced by the different contours between sealing element and housing wall, which prevents rotation of the sealing disc. A secure anti-twist protection of the sealing element can indeed be ensured in this way, but this produces limitations with reference to the maximum respectively adjustable through-flow cross section of the disc valve.

SUMMARY

It is an object of the invention to create a disc valve that easily and economically ensures anti-twist protection for the sealing element and at the same time offers optimal utilization of the installation space for a maximally large through-flow cross section.

The cross section or the interior of the housing can be optimally designed with reference to the largest possible through-flow cross section because the components of the disc valve necessary to ensure the anti-twist protection are relocated inwardly according to an exemplary embodiment in the area of the third through-flow openings. It is provided for this purpose according to the exemplary embodiment that the intermediate floor has at least one retaining projection that engages in one of the third through-flow openings for positively locking anti-twist protection of the sealing element. This takes advantage of the fact that the through-flow openings themselves already constitute a rotation stop, which is utilized by the respective retaining projection. The outer contour can thus be optimally adapted to the inner contour of the housing, whereby the surface of the sealing element is overall increased and the possible size of the through-flow openings can thereby be maximized. The configuration of the housing wall of the housing is furthermore simplified as a result of provision of the retaining projection in the area of the through-flow openings, which leads to advantages during production and ultimately also with regard to the durability of the disc valve.

It is preferably provided that at least one retaining projection engages into each of the third through-flow openings of the sealing element. This keeps the elastic sealing element from being pushed out of its position in some areas because of its deformability, so that the sealing effect of the sealing element is reduced. At least the third through-flow openings are retained essentially in place as a result of the provision of respectively one retaining projection in respectively one of the third through-flow openings, so that deformation that reduces the through-flow cross section is securely prevented.

According to an example embodiment, the respective retaining projection extends as a retaining bar over the entire inner periphery of the respective third through-flow opening. The contour of the in this respect ring-shaped retaining bar corresponds therefore to the contour of the respective third through-flow opening, so that the sealing element abuts laterally against the retaining bar in the area of the respective third through-flow opening. The appropriate tolerance selection ensures that the sealing element is always pressed in preloaded manner against the respective retaining bar in order to optimize the sealing effect in the area of the retaining bar. The retaining bar ensures that the contour of the respective third through-flow opening of the sealing element cannot change during operation.

According to another example embodiment, the second and/or third through-flow openings are configured at least essentially in the shape of segments of a circle. This ensures optimal utilization of the available, usually circular space of the disc valve. The available installation space can be especially optimally utilized for maximum possible through-flow cross sections by means of an additional arrangement of the flow openings in the shape of segments of a circle. Both the second and the third through-flow openings are practically configured in the shape of segments of a circle. The sealing element and/or the sealing disc have particularly preferably an area shaped as a segment of a circle, which is configured with no through-flow openings.

The sealing disc preferably has two of the second through-flow openings, each of which extends over at least one third of the circular sealing disc. As a result, about one third of the sealing disc remains as a through-flow opening-free area. The contour of the sealing element corresponds fundamentally at least to the contour of the sealing disc. The sealing element accordingly has two third through-flow openings. The third through-flow openings are preferably configured and arranged according to the second through-flow openings. The third through-flow openings are particularly preferably configured somewhat larger than the second through-flow openings in order to achieve advantageous flow conditions.

The outer contour of the sealing disc, the sealing element and the intermediate floor is particularly preferably provided with a circular configuration. The circular configuration ensures optimal utilization of the available installation space. On the other hand, a circular outer contour is not necessarily an advantage for the valve disc. Here an outer contour shaped as a segment of a circle, whereby the production of the valve disc is simplified and the material costs are reduced, is preferred. The circular configuration of the sealing element, sealing disc and intermediate floor ensures a ring-shaped or circular ring-shaped sealing area extending over the entire periphery at the outer rim area, which ensures the tightness of the disc valve.

According to an example embodiment, the anti-twist protection has at least one axial projection arranged on the intermediate floor, which at least essentially extends with a positive lock effect through a breakthrough of the sealing element and in some areas is inserted in a receiving recess of the sealing disc for its anti-twist protection. The axial projection can also be one of the retaining projections, which extends through the respective third through-flow opening over the sealing element into a corresponding second through-flow opening of the sealing disc. However, this requires a particularly high tolerance accuracy during production. The axial projection is therefore preferably arranged separately from the retaining projections, in particular in the area that is free of through-flow openings. The sealing disc has at the same time a special trough-shaped receiving recess, which is aligned with the breakthrough of the sealing element, so that the axial projection protrudes through the breakthrough into the receiving recess. The cross sections of the axial projection and breakthrough of the receiving recess are selected at the same time in such a way that the axial projection is inserted with a positively locking effect in the breakthrough and receiving recess in order to form at least fundamentally play-free, anti-twist protection for the sealing disc.

It is preferably provided that the intermediate floor of the housing has fourth through-flow openings that are aligned with the second and third through-flow openings, which are respectively allocated to one of the connections. The contour of the intermediate floor corresponds particularly preferably fundamentally to the contour of the sealing element, so that the latter rests flatly on the intermediate floor and is supported in a torque-proof manner thereon by means of the retaining bar or bars. A correspondingly large volume flow through the disc valve is ensured, since then also the fourth of the through-flow openings have at least fundamentally the same through-flow openings as the third and second through-flow openings. The volume flow is guided at the same time through one and/or the other second, third or fourth through-flow opening, depending on the rotational position of the valve disc, in order to arrive at one or the other connection. The through-flow openings practically form chambers or end in chambers that are allocated to the respective connection.

The housing has particularly preferably at least one partition wall, which divides the housing into two chambers, and which forms or contributes to forming the intermediate floor at its free face. The partition wall thus also serves as a support surface for the sealing element. The disc valve has thus overall at least three chambers. Two first chambers are located on one side of the sealing element, sealing disc and valve disc, and at least one second chamber is located on the other side. It is thus preferably provided that the inlet connection is allocated to the at least one second chamber, and the outlet connections are respectively allocated to the first and in particular the second chamber.

At least one section of the intermediate floor is preferably formed by a section in a housing wall of the housing. The section is practically formed by means of tapering of the cross section of the housing. The section preferably has a circular configuration corresponding to the housing wall shape of the housing and thus supports the sealing element over its entire periphery.

The sealing element is preferably made from an elastomer, in particular a terpolymer elastomer, in particular rubber. As a result the disc valve has a high service life with a securely ensured sealing effect.

It is furthermore preferably provided that a control shaft is connected in a torque-proof manner to the valve disc and has at least one radially projecting supporting projection at an axial distance from the valve disc. At least one spring element is supported in a preloaded/preloadable state between the supporting projection and the valve disc. The control shaft itself is practically axially supported on the housing, so that the valve disc is tight against the sealing disc, the sealing disc against the sealing element, and the sealing element against the housing as a result of the spring preload, whereby the sealing effect of the disc valve is overall ensured.

BRIEF DESCRIPTION OF THE DRAWINGS

Example embodiments will now be described with reference to the drawings.

DETAILED DESCRIPTION

Figure 1:
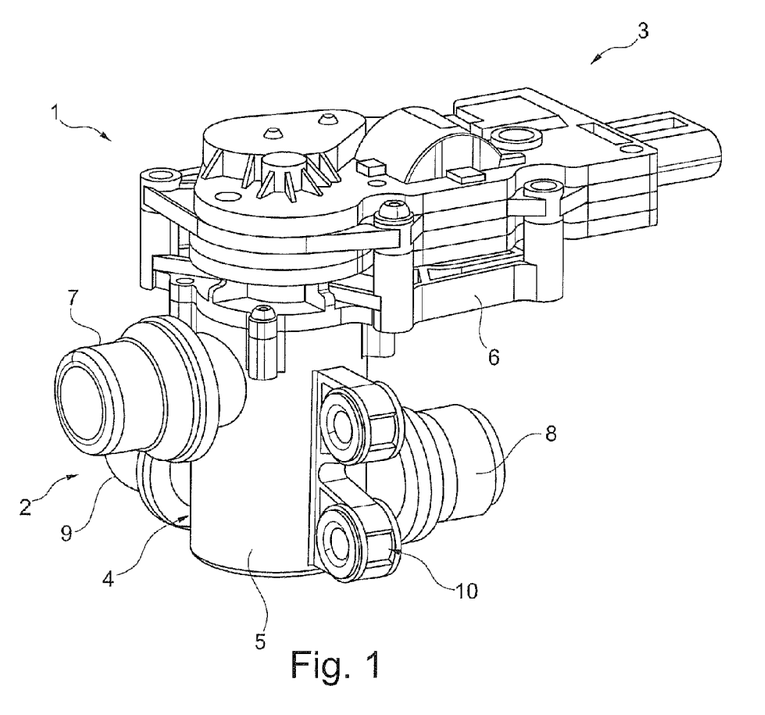
FIG. 1 is a perspective view of the disc valve according to an example embodiment.

FIG. 1 is a perspective view of a valve mechanism 1 having a disc valve 2 as well as an actuator 3 according to an example embodiment.

The disc valve 2 has a housing 4, which is formed by a distributor housing 5 and a cover 6. The distributor housing 5 has three connections, of which one is configured as an inlet connection 7, and the other two are configured as outlet connections 8 or 9. The distributor housing 5 additionally has a support device 10 for mounting the valve mechanism 1, for example, on a body of a motor vehicle.

Assembled on the cover is the actuator 3, which is especially configured as an electromotor actuator 3 and has for this purpose an electric motor, which is not depicted in detail, as well as a gear mechanism that can be coupled to a control shaft of the disc valve 2 in order to distribute as desired a medium made available at the inlet connection 7 to the outlet connections 8, 9.

Figure 2:
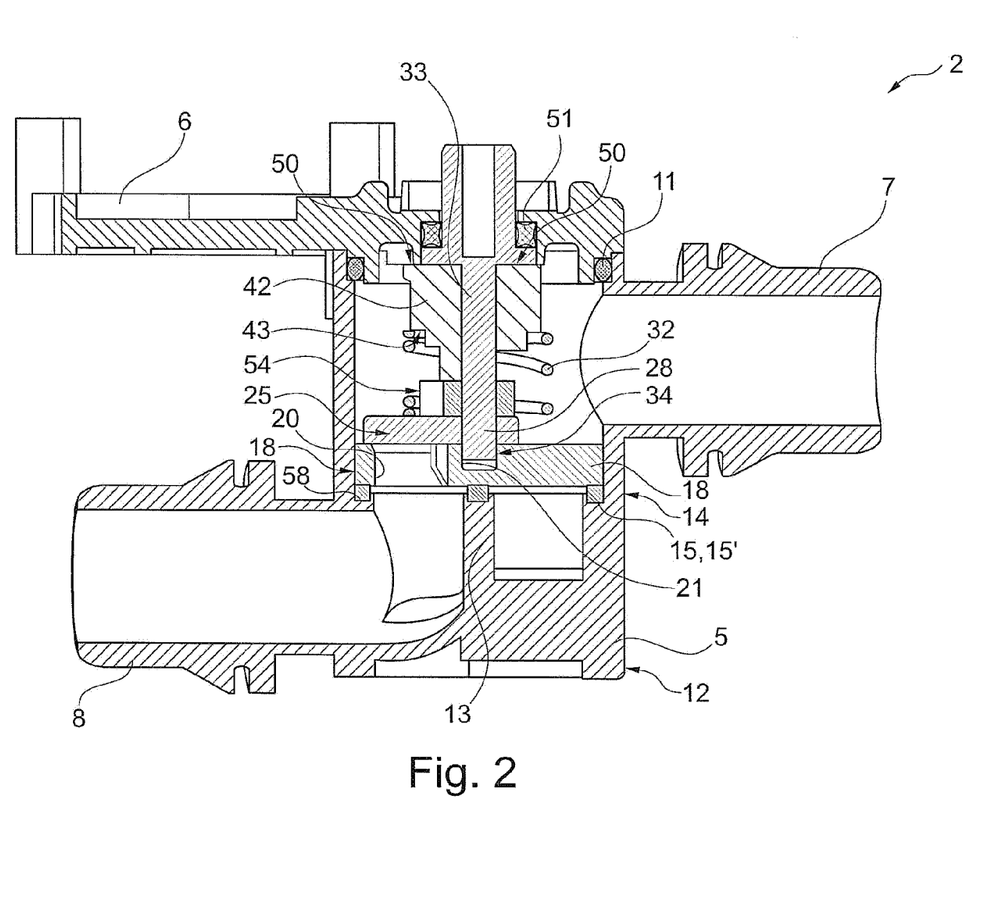
FIG. 2 is a longitudinal sectional view of the disc valve according to an example embodiment.

FIG. 2 shows for this purpose a longitudinal sectional view of the disc valve 2. The distributor housing 5 has an essentially cup-shaped configuration, so that it has a U-shaped basic shape seen in longitudinal section. The connections 7, 8, 9 are configured in this case as one piece with the distributor housing 5. The cover 6 seals the open end of the distributor housing 5. In addition, a sealing element 11, which is configured as O-ring in this case, is provided between cover 6 and distributor housing 5. The inlet connection 7 ends—seen from the axial direction— above the outlet connection 8 in the distributor housing 5, that is, close to the cover 6. A partition wall 13 runs from the base 12 of the distributor housing 5 located opposite the cover 6 and extends parallel to the longitudinal extension of the distributor housing 5 or extends axially and ends above the connection 8, forming an intermediate floor 14 with its free face.

Figure 3:
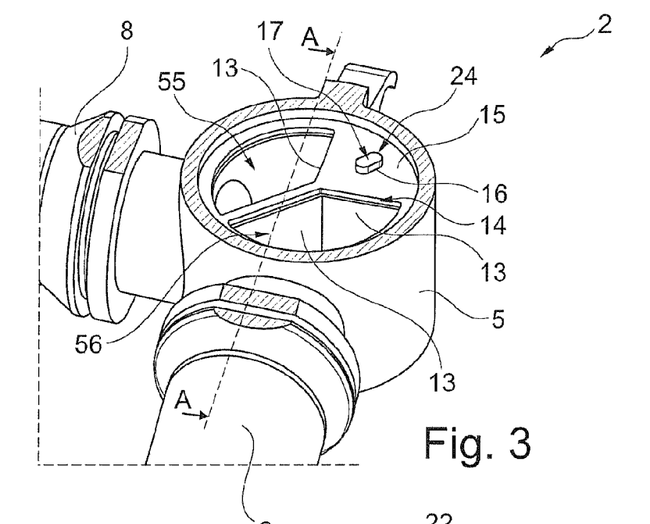
FIG. 3 is a cross sectional view of the disc valve according to an example embodiment.

FIG. 3 shows for this purpose a plan view of the intermediate floor 14 or the distributor housing 5 above the outlet connections 8 and 9 in a cross sectional view of the disc valve 2. The partition wall 13 forms two chambers 55, 56 in the distributor housing 5, in which ends one of the outlet connections 8, 9. The chambers 55 and 56 make up about two thirds of the distributor housing 5, while a remaining third is formed by the intermediate floor 14 and is configured free of through-flow openings. The partition wall 13 has an area that widens at one end for this purpose in the shape of a segment of a circle. The intermediate floor 14 extends in part in the shape of a bar along the inner side of the housing wall of the distributor housing 5 over the entire periphery of the distributor housing 5 in order to form a continuous support surface. The bar-shaped section is formed by a section 58 in the distributor housing 5, which is realized by means of a cross sectional tapering, as shown in particular in FIG. 2. It is supplemented by means of the free face of the partition wall 13. The chambers 55 and 56 respectively thus extend fundamentally over approximately 120° of the circular distributor housing 5, while a large part of the intermediate floor 14 is formed by the remaining 120° through the partition wall 13.

A sealing element 15 configured as profile seal 15', whose contour essentially corresponds to the contour of the intermediate floor 14 and is configured to be elastically deformable, rests on the intermediate floor 14. The profile seal 15' has a breakthrough 16, through which an axial projection 17 of the intermediate floor 14 protrudes in order to form anti-twist protection 24 for the profile seal 15'. The height of the axial projection 17 is selected at the same time in such a way that it projects beyond the profile seal 15'.

Figure 4A:
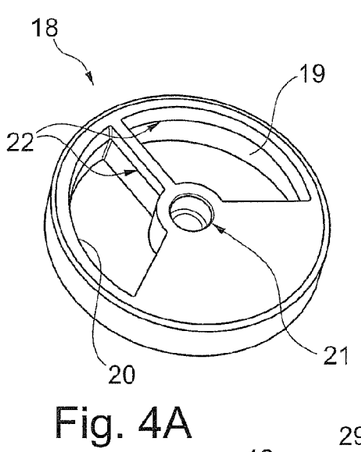
FIGS. 4A and 4B are different perspective views of a sealing disc of the disc valve according to an example embodiment.
Figure 4B:
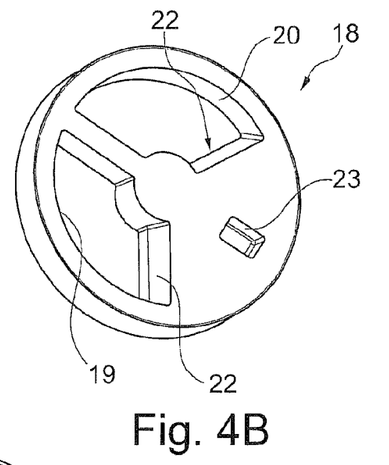

FIGS. 4A and 4B are two perspective views of a ceramic sealing disc 18 of the disc valve 2. According to FIG. 2, the sealing disc 18 rests on the sealing element 15. The contour of the sealing disc 18 at least fundamentally corresponds to the contour of the profile seal 15' or the intermediate floor 14.

FIG. 4A is a plan view of the sealing disc 18 from the direction of the cover 6 according to FIG. 2. The sealing disc 18 has two through-flow openings 19, 20, which each likewise represent a segment of a circle, which extends over approximately 120° corresponding to the chambers 55 and 56. The sealing disc 18 has in addition a bearing seat 21, which is configured as a cylindrical recess in the center in the sealing disc 18 on the face that faces toward the cover 16.

Each of the through-flow openings 19, 20 is provided on the same face with a chamfer 22, which serves for improvement of the flow conditions.

Such chamfers 22 are also provided on the rear side of the sealing disc 18 in the area of the through-flow openings 19, 20, as shown in FIG. 4B. The sealing disc 18 also has, on its face that faces away from the cover 16, a receiving recess 23 whose contour essentially corresponds to the contour of the axial projection 17 and serves at least in certain areas to receive the axial projection 17, in order to form an at least fundamentally play-free, anti-twist protection for the sealing disc 18 on the intermediate floor 14.

Figure 5:
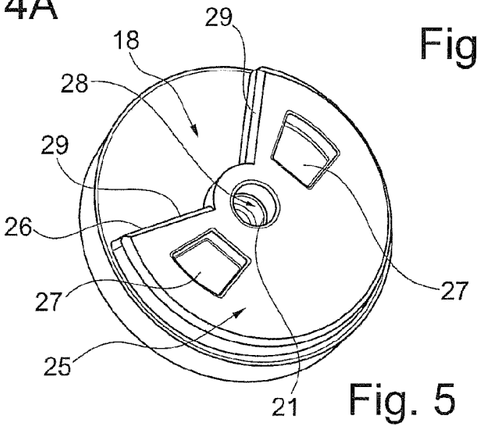
FIG. 5 is a perspective view of a valve disc that interacts with the sealing disc according to an example embodiment.

FIG. 5 is another plan view of the sealing disc 18, namely on the face that faces toward the cover. A valve disc 25, which is likewise made from ceramic and whose outer diameter essentially corresponds to the outer diameter of the sealing disc 18, is additionally arranged at the same time on the sealing disc 18. The outer diameter of the valve disc 25 is configured to be slightly smaller in the present exemplary embodiment in order to prevent frictional contact with the surface of the inner side of the distributor housing 5, as is also shown in FIG. 2. The valve disc 25 is configured in the form of a segment of a circle and extends over a segment of a circle of about 240°. The remaining 120° of the valve disc 25 are free and configured with open edges in order to form a through-flow opening 26, which set a through-flow cross section with an overlapping position with at least one of the through-flow openings 19, 20 of the sealing disc 18. A desired through-flow cross section between the inlet connection 7 and at least one of the outlet connections 8, 9 can be set depending on the rotational position of the valve disc 25. The valve disc 25 rests flatly on the sealing disc 18 and has two trough-shaped hollows 27, which are arranged at both sides of the center point of the valve disc 25 and are mirror symmetric, but not point symmetric, on its face that faces away from the valve disc 18, so that incorrect assembly of the disc valve 2 is prevented, as will be explained in more detail later. The valve disc 25 also has a circular breakthrough 28 in the center, which forms an extension of the bearing seat 21 and in this respect also has a circular contour. The valve disc 25 is also provided with chamfers 29 on the through-flow opening 26 for an improved through-flow behavior.

Figure 6:
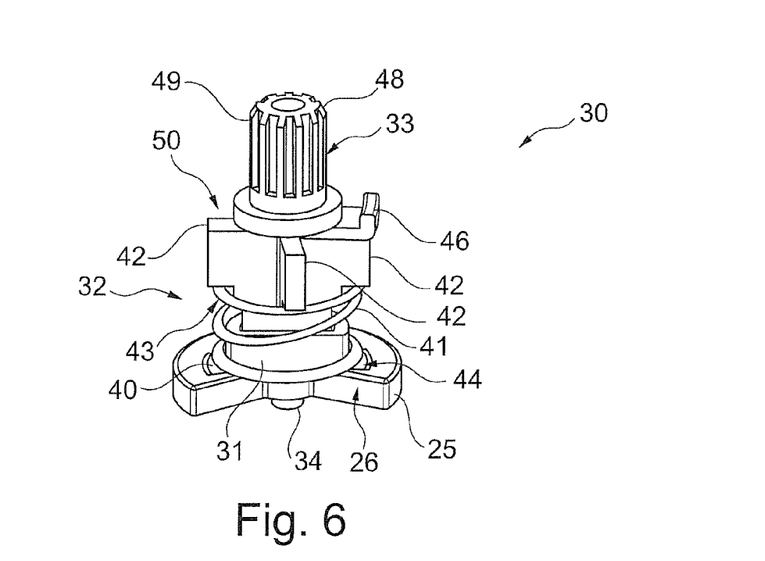
FIG. 6 is a perspective view of a preassembled structural component of the disc valve according to an example embodiment.

FIG. 6 is a perspective view of a preassembled structural component 30, which consists of the valve disc 25, an intermediate element 31, a spring element 32 and a control shaft 33.

The control shaft 33 protrudes with a free end 34 through the breakthrough 28 of the valve disc 25 in order to engage in the bearing seat 21, as shown in FIG. 2. For this purpose, the free end 34 of the control shaft 33 is likewise configured in a cylinder shape, and the outer diameter of the free end 34 and the inner diameter of the bearing seat 21 are selected in such a way that together they form a radial friction bearing for the control shaft 33.

Figure 7A:
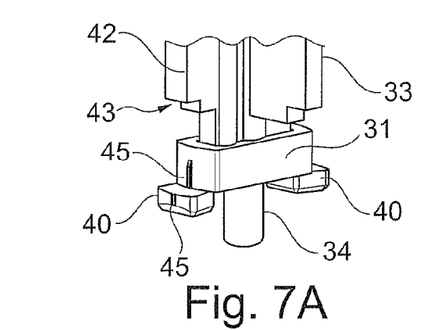
FIGS. 7A and 7B are different views of the anti-twist protection of the disc valve according to an example embodiment.
Figure 7B:
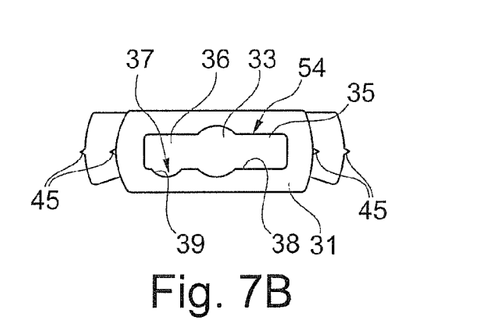

The control shaft 33 has an asymmetrical cross sectional contour at a distance from the free end 34, as shown in FIGS. 7A and 7B. FIG. 7B shows for this purpose a cross section through the control shaft 33 in the area of the intermediate element 31. The control shaft 33 has herein two mutually opposite projections 35, 36, which jut radially out of the control shaft 33. The projection 36 has an additional projection 37 on a side wall, which has a curved contour in the present exemplary embodiment. The intermediate element 31 has an opening 38 that corresponds to the contour of the control shaft 33 in the area of the projections 36, 35. The opening 38 has an additional recess 39 on the side, in which the additional projection 37 can be inserted. The control shaft 33 and the intermediate element 31 can thus be connected to in just one way. Incorrect assembly is securely prevented in this way.

FIG. 7A is a perspective view of the control shaft 33 with the intermediate element 31. On its side that faces toward the valve disc 25, the intermediate element 31 has two leg supports 40, which are preferably configured as one piece with the intermediate element 31 and can be introduced or engage into the recesses 27 of the valve disc 25. Only a single assembly position for the control shaft 33 and the valve disc 25 is possible here also because of the asymmetrical shape of the recesses 27 and the asymmetrical configuration of the leg supports 40. Positively locking, anti-twist protection 54 is formed in this way on the whole between the control shaft 33 and the valve disc 25.

The spring element 32 is configured as a helical spring 41 in the present exemplary embodiment. The helical spring 41 is axially supported between the laterally projecting leg supports 40 of the intermediate element 31 and several radially projecting support projections 42 of the control shaft 33. The supporting projections 42 are at the same time evenly distributed over the periphery of the control shaft 33 and are configured as one piece with same. Two mutually opposite supporting projections 42 preferably merge into the lateral projections 35 and 26. The supporting projections 42 together form a first axial stop 43 for the helical spring 41, while the leg supports 40 form a second axial stop for the helical spring 41. The helical spring 41 is pushed onto the control shaft 33 up to the first axial stop 43 during assembly; the intermediate element 31 is then pushed onto the control shaft 33 as previously described, and finally the valve disc 25, so that the supports 40 engage in the recesses 27.

Figure 8:
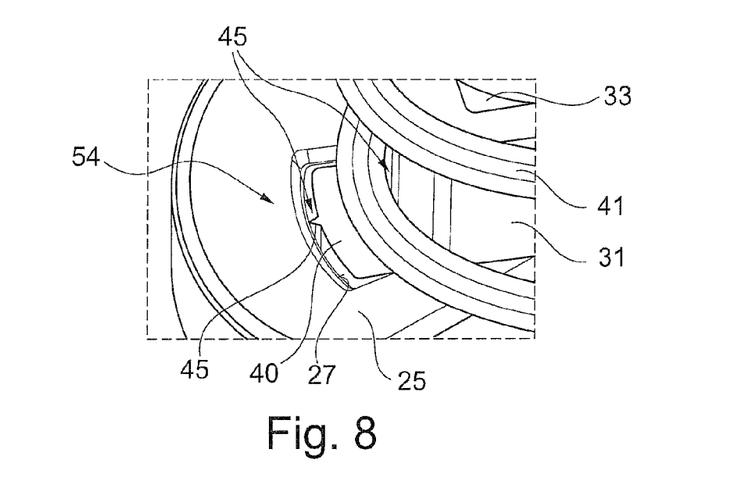
FIG. 8 shows a locking mechanism of the preassembled structural component according to an example embodiment.

The intermediate element 31 has several deformable clamping ribs 45, which extend in bar-like manner parallel to the longitudinal extension of the disc valve 2 or to the rotational axis of the control shaft 33, to lock the preassembled structural component 30, as shown in FIG. 8. The dimensioning of the clamping ribs 45 is selected at the same time in such a way that a frictional connection between the intermediate element 31 and the helical spring 41 as well as between the intermediate element 31 and the valve disc 25 is produced because of the preloading force made available by the elasticity, which ensures the cohesion of the preassembled structural component 30.

It is furthermore provided that the control shaft 33 has a radial projection 46 on the side of the supporting projections 42 that face away from the spring element 41, which is shown in FIG. 6. The radial projection 46 is arranged in a predefined position relative to the control shaft 33 with reference to projections 35 and 36 and is especially configured as one piece therewith, so that a clear position of the valve disc 25 relative to the radial projection 46 exists during assembly of the disc valve 2 or the preassembled structural component 30. This is also ensured by means of the respective connections that make available only one assembly option.

Figure 9:
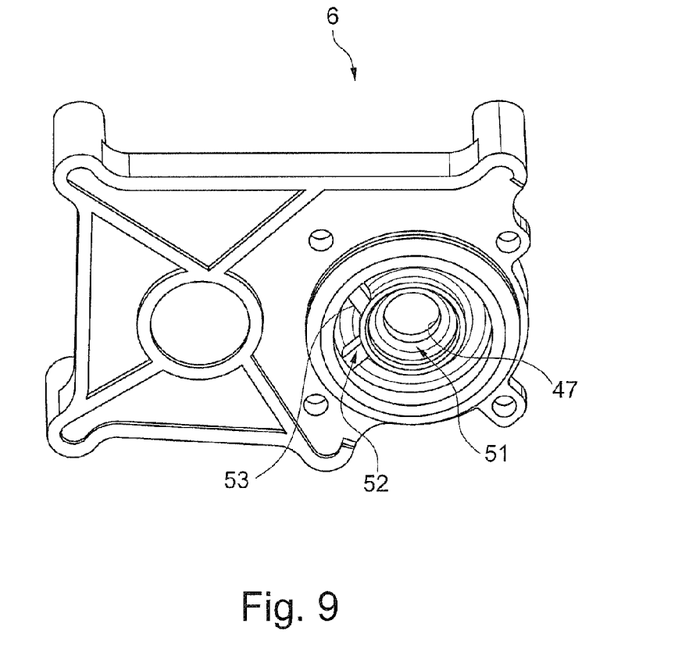
FIG. 9 is a perspective view of a cover of the disc valve according to an example embodiment.

FIG. 9 shows the cover 6 in a perspective view from below or seen from the distributor housing 5. The cover 6 has a bearing opening 47, through which the end of the control shaft 33 that is opposite the free end 34 can be guided. This end is configured as a coupling end 48 and has for this purpose an external tooth system 49 on its outer periphery, which can be coupled to the actuator 3 or can be brought into operative connection therewith. As shown in FIG. 2, the leg supports 42 form at their side that is opposite to the first axial stop 43 a second axial stop 50, with which the control shaft 33 is supported on the inner side of the cover 6. A sealing ring 51 is advantageously provided for sealing. The bearing opening 47 as well as the coupling end 48 of the control shaft 33 are configured in such a way that the control shaft 33 is mounted radially in the bearing opening 47 and axially on the cover 6.

As is apparent from FIG. 9, the cover 6 additionally has on its lower side two rotation stops 52 and 53 formed by respectively one axial projection on the lower side of the cover and is located in the movement path of the radial projection 46 when the disc valve 2 is assembled. If the control shaft 33 is actuated by means of the actuator 3, then it can only be turned between the two positions defined by the rotation stops 42 and 43 until respectively the radial projection 46 strikes one of the rotation stops 52 or 53. The rotation stops 52 and 53 can naturally also be formed by a single correspondingly wide or shaped projection of the cover 6.

The cover 6 as well as the distributor housing 5 are configured in such a way that they can only be connected to each other in a specific relative position, so that the cover 6 is unequivocally oriented toward the distributor housing 5. The rotation stops 53 and 52 are located as a result at known positions with reference to the chambers 55, 56 or with reference to the through-flow openings 19 and 20. The disc valve 2 can be brought during the assembly by means of the actuator into a clear initial position as a result of the torque-proof connection of the valve disc 25 with the control shaft 33 as well as the torque-free position of the sealing disc 18 and the known arrangement of the radial projection as well as the rotation stops 52, 53 without having to verify this by checking the actually adjusted volume flow through the disc valve 2.

The preassembled structural component 30 is put together during assembly according to FIG. 6. The preassembled structural component is subsequently inserted into the distributor housing 5, in which the profile seal 15' as well as the sealing disc 18 are already arranged and aligned according to the axial projection 17, so that the free end 34 of the control shaft 33 engages in the bearing seat 21, as shown in FIG. 2. The cover 6 is additionally pushed with the bearing opening 47 onto the coupling end 48 of the control shaft 33 and the control shaft 33 is braced against the helical spring 41 as a result of the first axial stop 43, so that the valve disc 25 is pressed against the sealing disc 18 under the action of the spring, so that the valve disc 25 and the sealing disc 18 abut tightly against each other and securely prevent an undesired flow through the disc valve 2. The cover 6 can be screwed, for example, with the distributor housing 5, as shown in FIG. 1, in order to ensure a durable connection to the housing 4. The rotation stops 52, 53 and the radial projection 46 are securely protected from external influences and are in this respect less susceptible to contamination because they are arranged inside the housing 4. The valve disc 25 and sealing disc 18 disconnect or connect the chambers 55 and 56 from or to a chamber 57, which is allocated to the inlet connection 7 and is delimited by the distributor housing 5, the cover 6 and the valve disc 25 and sealing disc 18, depending on the rotational position of the valve disc 25.

Figure 10:
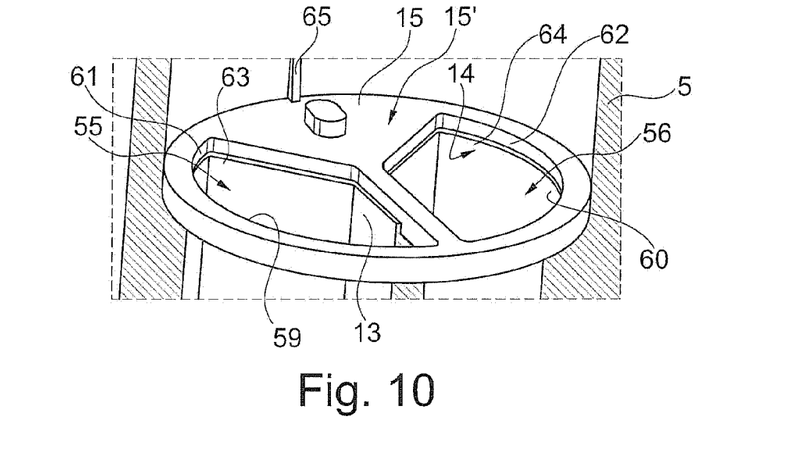
FIG. 10 is a sectional view of a distributor housing of the disc valve with a sealing element according to an example embodiment.

Going back to FIG. 3, the profile seal 15' will be described in more detail with the aid of FIG. 10. FIG. 10 shows for this purpose a sectional view of the disc valve 2 according to line A-A of FIG. 3. The profile seal 15' itself is not shown in section.

As already explained with reference to FIGS. 2 and 3, the profile seal 15' rests flatly on the intermediate floor 14 of the housing 4 of the distributor housing 5. The intermediate floor 14 is formed by the free face of the partition wall 13. The contour of the intermediate floor 14 corresponds fundamentally to the contour of the profile seal 15' or the sealing element 15. The chambers 55, 56 form respective through-flow openings 59 or 60, which correspond to the through-flow openings 19, 20 of the sealing disc 18, at their end that faces toward the profile seal 15' as a result of the previously described configuration of the distributor housing 5 by means of the partition wall 13. The sealing element 15 likewise has two through-flow openings 61, 62, which are respectively aligned with the through-flow openings 59 or 60, as a result of the previously described configuration that corresponds to the contour of the intermediate floor 14. The intermediate floor 14 is configured somewhat wider than the profile seal 15' in the area of the through-flow openings 61, 62, so that the through-flow openings 59, 60 have a slightly smaller cross section than the through-flow openings 61, 62. The intermediate floor 14 has in this area a retaining projection 63 or 64, which is configured as a retaining bar and extends over the entire periphery of the respective through-flow opening 61, 62 or 59, 60, at each of the through-flow openings 59, 60. The configuration of the intermediate floor 14 and the sealing element 15 is selected in such a way that the sealing element 15 is kept braced between the lateral housing wall of the distributor housing 5 and the retaining projections 63, 64. The retaining projections 63, 64 have at the same time a height that is less than the height of the sealing element 15, so that the latter—seen axially—is inserted in some areas into the groove formed by the housing wall and retaining projections 63, 64. Since the contours of the retaining projections 63, 64 or the retaining bars correspond to the contour of the through-flow openings 61, 62 of the sealing element 15, they likewise serve for anti-twist protection of the sealing element 15 and ensure that the elastically deformable sealing element 15 is not deformed during operation in such a way that it covers some areas of the through-flow openings 59, 60, whereby the respectively predeterminable through-flow cross section would be accordingly reduced.

Figure 11:
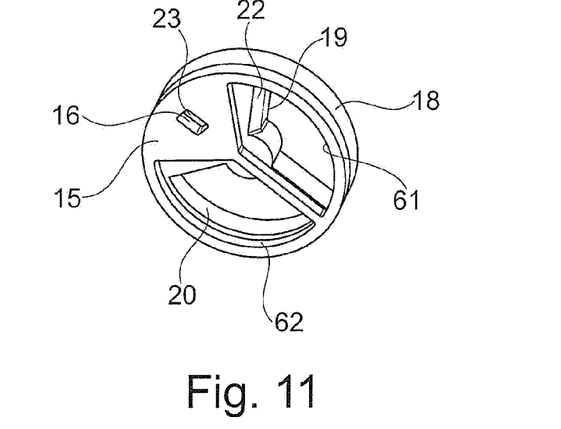
FIG. 11 is a perspective view of the sealing element that interacts with the sealing disc according to an example embodiment.

As can be seen in FIG. 11, which shows a perspective bottom view of the assembly arrangement of sealing element 15 and sealing disc 18, the through-flow openings 61, 62 of the sealing element 15 are configured to be somewhat larger than the through-flow openings 19, 20 of the sealing disc 18, so that the sealing element 15 rests fully flat on the lower side of the sealing disc 18. The through-flow values are not or hardly influenced by the sealing element 15. A circular sealing section, which extends over the entire periphery and accordingly interacts with the sealing disc 18 and the intermediate floor 14, is formed on the outer periphery as a result of the provision of means for anti-twist protection of the profile seal 15' or sealing element 15 in the inner area.

One or several detents 65 are preferably configured on the housing wall of the distributor housing 5 in order to axially secure the sealing element 15 on the intermediate floor 14, in particular for assembly purposes, and lead to a radial deformation of the sealing element 15 during insertion on the intermediate floor 14. A rear grip seat with the detents 65 is formed in the inserted state, which prevents spontaneous release of the sealing element 15 out of the distributor housing 5. As also shown in FIG. 3, three detents 65 that are distributed at regular intervals over the periphery are provided according to the present exemplary embodiment. The detents 65 serve at the same time preferably as clamping ribs for the sealing disc 18 for further anti-twist protection of the sealing disc 18.

Thus on the whole a disc valve 2 is offered, which allows the largest possible through-flow cross sections by virtue of the advantageous anti-twist protection and securely and economically prevents twisting in particular of the sealing element 15.

In summary, a disc valve 2, in particular a multiway control valve is provided which has a housing 4 that has at least one inlet connection 7 and at least one outlet connection 8, 9 as connections 7, 8, 9 for a liquid and/or gaseous medium, at least one rotatably mounted valve disc 25, in particular a ceramic valve disc, which is provided with at least one first through-flow opening 26 and is arranged rotatably mounted in the housing 4, in order to fluidically connect and disconnect the connections 7, 8, 9 depending on its rotational position. The valve disc 25 rests flatly on at least one sealing disc, in particular a ceramic sealing disc 18, which is arranged in a torque-proof manner and has at least two second through-flow openings 19, 20, and a sealing element 15, which is arranged between the sealing disc 18 and an intermediate floor 14 of the housing 4 and is elastically deformable. The sealing element 15 is configured in disc shape and has third through-flow openings 61, 62 that are aligned with the second through-flow openings 19, 20, characterized in that the intermediate floor 14 has at least one retaining projection 63, 64 that engages in one of the three through-flow openings 61, 62 for positively locking anti-twist protection of the sealing element 15.

According to an example embodiment, at least one retaining projection 63, 64 engages in each of the third through-flow openings 61, 62.

According to another example embodiment, each retaining projection 63, 64 extends as a retaining bar over the entire inner periphery of the respective third through-flow opening 61, 62.

According to a further example embodiment, the second and/or third through-flow openings 19, 20; 61, 62 are configured at least fundamentally in the shape of a segment of a circle.

According to yet another example embodiment, the sealing disc 18 has two of the second through-flow openings 19, 20, which respectively extend in particular over one third of the sealing disc 18.

According to an example embodiment, the contour of the sealing element 15 at least fundamentally corresponds to the contour of the sealing disc 18. The outer contour of the sealing disc 18, the sealing element 15 and the intermediate floor 14 are respectively configured in a circular shape.

According to another example embodiment, the anti-twist protection 24 has at least one axial projection 17 that is arranged off-center on the intermediate floor 14 and extends through the breakthrough 16 of the sealing element 15 at least fundamentally in a positively locking manner and is inserted at least in some areas into a receiving recess 23 of the sealing disc 18 for its anti-twist protection.

According to a further example embodiment, the intermediate floor 14 has fourth through-flow openings 59, 60 that are aligned with the second and third through-flow openings 19, 20; 61, 62 and are respectively allocated to only one of the connections 8, 9.

According to yet another example embodiment, at least one partition wall 13, which divides the housing 4 into at least two chambers 55, 56 and forms or contributes to forming the intermediate floor 14 on its free face. At least one section of the intermediate floor 14 is formed by a section 58 on a housing wall of the housing 4.

According to an example embodiment, the sealing element 15 is made from an elastomer, in particular from a terpolymer elastomer.

According to another example embodiment, a control shaft 33 is connected in a torque-proof manner to the valve disc 25 and has at least one supporting projection 42 at an axial distance from the valve disc 25. At least one spring element 32 is supported in a preloaded/preloadable state between the supporting projection 42 and the valve disc 25.

What is claimed is:

1. A disc valve comprising:
a housing comprising connections for a liquid medium or a gaseous medium or both including at least one inlet connection and at least one outlet connection;
at least one sealing disc arranged in a torque-proof manner and having at least two second through-flow openings;
at least one rotatably mounted valve disc rotatably mounted in the housing to fluidically connect and disconnect the connections depending on its rotational position and comprising at least one first through-flow opening, wherein the at least one rotatably mounted valve disc rests flatly on the at least one sealing disc, and
a sealing element that is elastically deformable and arranged between the at least one sealing disc and an intermediate floor of the housing, wherein the sealing element is configured in a disc shape and has third through-flow openings that are aligned with the second through-flow openings, wherein the intermediate floor comprises a retaining projection that engages in one of the third through-flow openings for positively locking anti-twist protection of the sealing element, wherein the anti-twist protection has at least one axial projection that is arranged off-center on the intermediate floor and that extends through a breakthrough of the sealing element at least fundamentally in a positively locking manner and is inserted at least in some areas into a receiving recess of the sealing disc for its anti-twist protection.

2. The disc valve according to claim 1, wherein the retaining projection engages in each of the third through-flow openings.

3. The disc valve according to claim 1, wherein the retaining projection extends as a retaining bar over the entire inner periphery of a respective third through-flow opening.

4. The disc valve according to claim 1, wherein the at least two second through-flow openings or the third through-flow openings or both are configured in a shape of a segment of a circle.

5. The disc valve according to claim 1, wherein the sealing disc includes two of the at least two second through-flow openings which extend over at least one third of the sealing disc.

6. The disc valve according to claim 1, wherein a contour of the sealing element corresponds to a contour of the sealing disc.

7. The disc valve according to claim 1, wherein outer contours of the sealing disc, the sealing element and the intermediate floor are respectively configured in a circular shape.

8. The disc valve according to claim 1, wherein the intermediate floor has fourth through-flow openings that are aligned with the at least two second through-flow openings and the third through-flow openings, each of the fourth through-flow openings being respectively allocated to only one of the connections.

9. The disc valve according to claim 1, further comprising at least one partition wall which divides the housing into at least two chambers and which forms or contributes to forming the intermediate floor on its free face.

10. The disc valve according to claim 1, wherein at least one section of the intermediate floor is formed by a section on a housing wall of the housing.

11. The disc valve according to claim 1, wherein the sealing element is made from an elastomer.

12. The disc valve according to claim 11, wherein the sealing element is made from a terpolymer elastomer.

13. The disc valve according to claim 1, further comprising a control shaft which is connected in a torque-proof manner to the valve disc and which has at least one supporting projection at an axial distance from the valve disc, and
at least one spring element which is supported in a preloaded or preloadable state between the supporting projection and the valve disc.

14. The disc valve according to claim 1, wherein the disc valve is a multiway control valve,
wherein the at least one rotatably mounted valve disc is a ceramic valve disc, and
wherein the at least one sealing disc is a ceramic sealing disc.

15. The disc valve according to claim 1, wherein the retaining projection is one of a plurality of retaining projections that engage in one of the third through-flow openings for positively locking anti-twist protection of the sealing element.

* * * * *